Nov. 14, 1967 A. E. NEWBERG 3,352,017
WATER DEPTH INDICATING DEVICE
Filed May 27, 1965 2 Sheets-Sheet 1
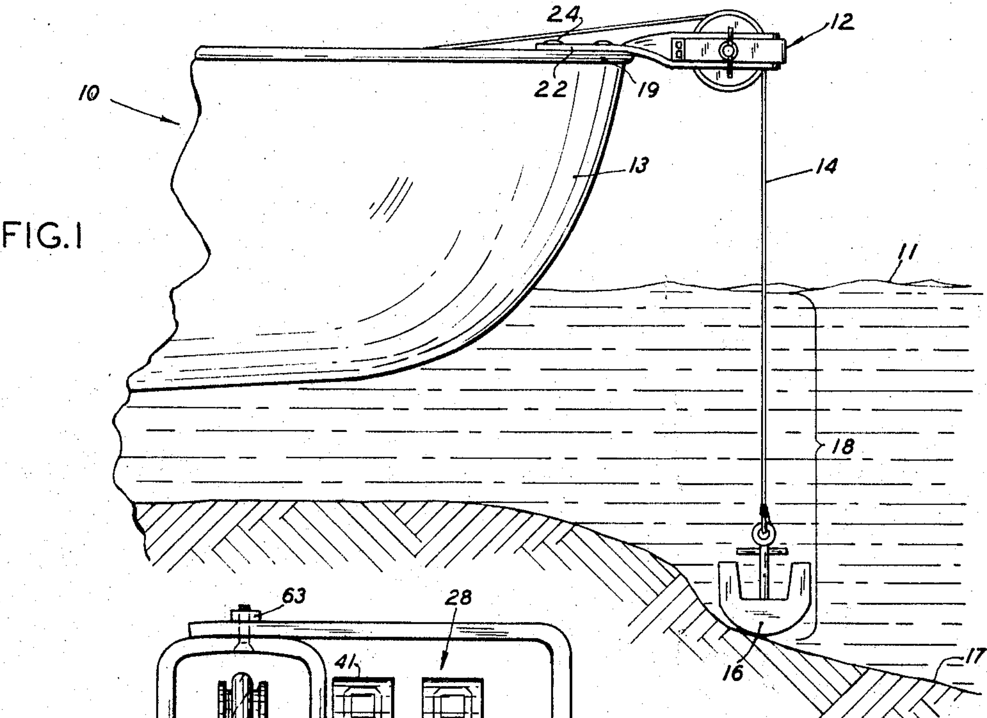
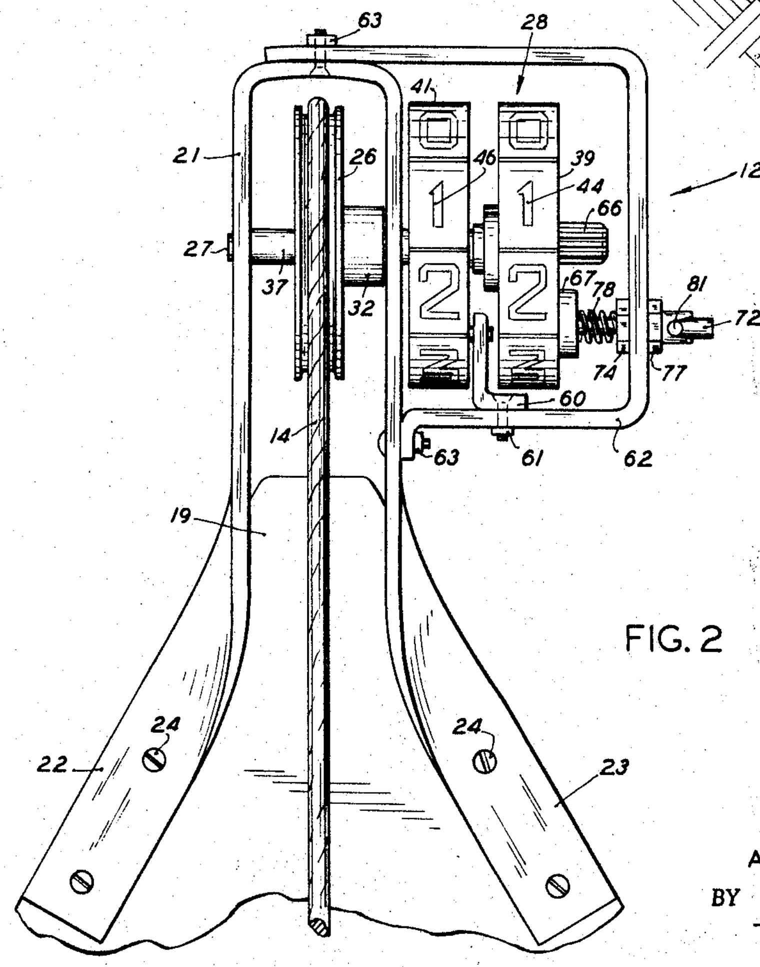
INVENTOR.
ALLEN E. NEWBERG
BY
Braddock & Burd
ATTORNEYS WATER DEPTH INDICATING DEVICE
Filed May 27, 1965 2 Sheets-Sheet 2
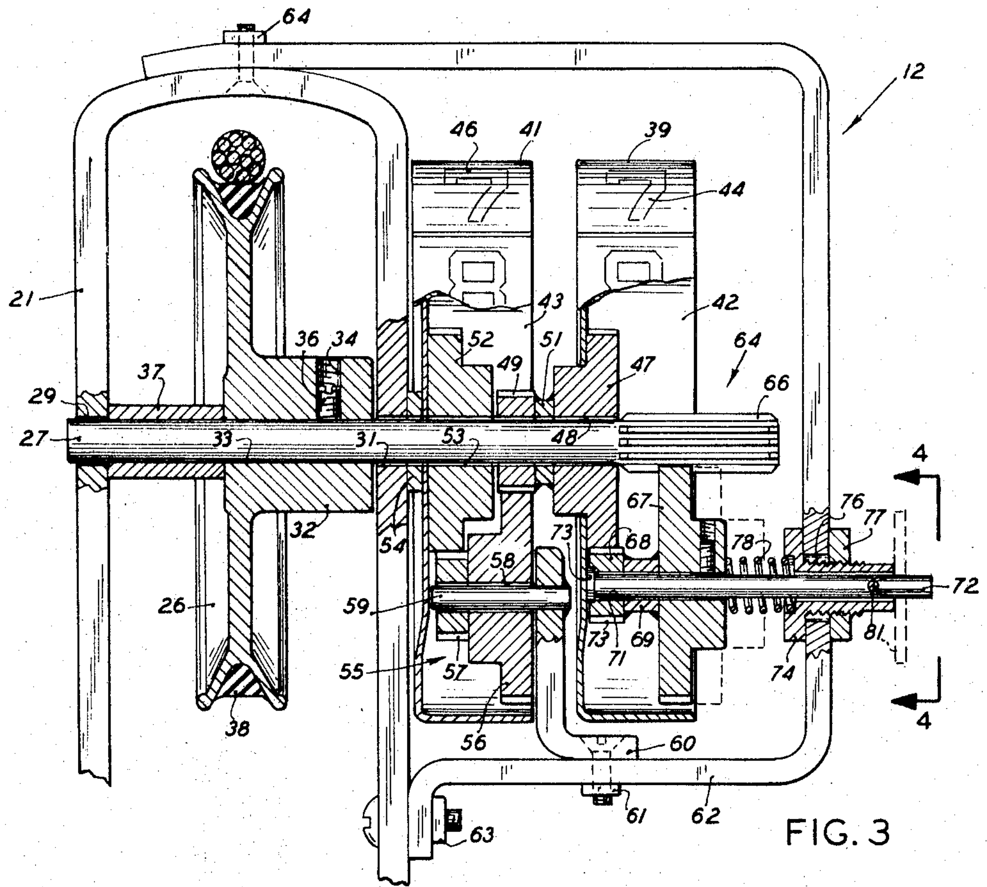
FIG. 3
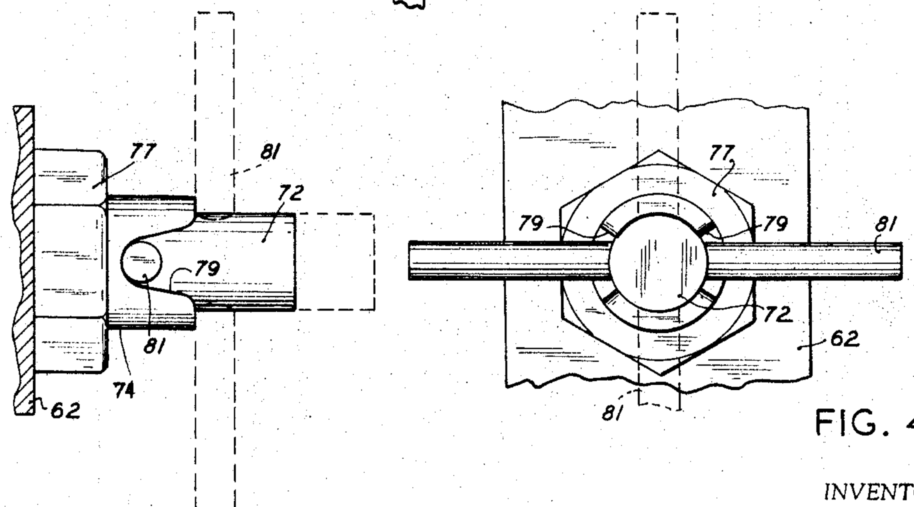
FIG. 5
FIG. 4
INVENTOR.
ALLEN E. NEWBERG
BY *Braddock & Burd*
ATTORNEYS United States Patent Office 3,352,017
Patented Nov. 14, 1967

3,352,017
WATER DEPTH INDICATING DEVICE

Allen E. Newberg, Box 374, St. James, Minn. 56081

Filed May 27, 1965, Ser. No. 459,219
7 Claims. (Cl. 33—126.5)

ABSTRACT OF THE DISCLOSURE

A combination anchor and water depth indicator mounted on the bow of a fishing boat. An anchor line trained over a pulley mounted on a shaft is attached to a boat anchor. Rotation of the pulley on movement of the line operates a gear train driving a pair of discs mounted on the shaft. The discs have circumferential flanges with numerical indicia for reading water depth. A clutch included in the gear train operates to release the gear drive so that the discs can be rotated back to their zero positions.

This invention relates to a measuring instrument and more particularly to a device used in combination with an anchor and anchor line for indicating water depth.

It is the object of the invention to provide an improved measuring device for ascertaining water depth at a particular location in a body of water, such as a lake or river.

Another object of the invention is to provide a water depth indicating device which is readily attachable to a fishing boat and utilizes the anchor and anchor line in the boat for measuring line movement to determine water depth enabling the fisherman to find deep areas in a lake and to set the length of a fishing line. A further object of the invention is to provide a water depth indicating device operated by movement of an anchor line in opposite directions to either raise or lower the anchor. Still a further object of the invention is to provide a measuring device which is usable to measure the length of an anchor line put out after the anchor has reached the bottom to determine the best holding position of the anchor.

Yet a further object of the invention is to provide a water depth indicating device with disk members having numerical indicia capable of being set to zero positions without disassembling the device.

Another object of the invention is to provide a compact water depth indicating device having a single shaft secured to a pulley rotatable by movement of an anchor line and carrying disk members having numeral indicia used to read water depth.

A further object of the invention is to provide a water depth indicating device for fishing boats which can be operated with one hand and easily read by the fisherman.

An additional object of the invention is to provide a compact and rugged water depth indicating device which is economical in cost and reliable and efficient in use.

These and other objects and advantages of this invention will become apparent upon reference to the following description and accompanying drawings wherein:

FIGURE 1 is a side view of an anchored boat equipped with the water depth indicator device of this invention;

FIGURE 2 is an enlarged plan view of the water depth indicator device of FIGURE 1;

FIGURE 3 is an enlarged fragmentary partly sectioned plan view of the water depth indicator device of FIGURE 1;

FIGURE 4 is an enlarged view taken along the line 4—4 of FIGURE 3; and

FIGURE 5 is an enlarged fragmentary plan view of the cam operator for the gear train clutch.

Referring to the drawings, there is shown in FIGURE 1, a vessel 10 such as a fishing boat or pontoon floating on a body of water 11 as a lake, river or the like. The vessel or boat 10 is equipped with the water depth indicator device of this invention indicated generally at 12. The device 12 is secured to the top of the bow 13 of the boat and carries a line 14 secured at its lower end to an anchor 16. The opposite end of the line is attached to a portion of the inside of the boat. The boat is shown as being anchored to the bottom 17. As the anchor 16 engages the bottom 17 and is below the surface of the water 11 by a depth indicated at 18. As shown in FIGURE 2, the water depth indicating device 12 is secured to the bow cap or deck member 19 and projects in a forward direction enabling the line 14 and anchor 16 is to be raised and lowered without interference from the bow 13 of the boat.

The indicating device 12 comprises a U-shaped frame 21 having outwardly diverging legs 22 and 23 secured to the top of the cap 19 by bolts 24. The legs 22 and 23 are integrally joined with the U-shaped frame and have approximately 90 degree twists so as to lie flat on the cap 19. The legs 21 and 22 may be upright and secured to opposite side portions of the bow 13. Positioned within the U-shaped frame 21 is a pulley 26 mounted on a transverse shaft 27. One end of the shaft 27 projects laterally of the frame 21 and carries a number registering apparatus indicated generally at 28. The line 14 being attached to the anchor 16 is moved to either raise or lower the anchor and thus rotates the pulley 26. With the pulley 26 secured to the shaft 27 the shaft 27 rotates operating a drive mechanism of the number registering apparatus whereby the depth of the water may be determined by the amount of line moving over the pulley 26.

Referring to FIGURE 3, the shaft 27 projects through axially aligned holes 29 and 31 in the frame 21 so as to rotatably mount the shaft 27 on the frame 21. The pulley 26 is a V-pulley having a hub 32 and an axial bore 33 accommodating the shaft 27. The hub 32 has a threaded bore 34 open to the axial bore 33. A set screw 36 is turned into the threaded bore 34 and engages the shaft 27 to secure the pulley 26 to the shaft. A spacer sleeve 37 positioned concentrically about the shaft 27 engages at its opposite ends the frame 21 and pulley 26 to maintain the pulley 26 centered within the frame 21. Slippage between the line 14 and the pulley 26 is reduced by friction material 38, such as friction or rubber tape, positioned in the peripheral groove of the pulley 26.

The number registering apparatus 28 comprises a pair of side-by-side disk members 39 and 41 rotatably mounted on the shaft 27. Secured to the periphery of the disk members 39 and 41 are outwardly directed lateral circumferential flanges 42 and 43 having a numerical indicia 44 and 46. As shown in FIGURE 2, the indicia 44 and 46 have a 0 to 9 pattern circumferentially spaced around the flanges 42 and 43. The size of the indicia 44 and 46 is preferably sufficiently large so that it may be visually observed and read from distances of 10 or more feet.

The disk member 39 is secured to the side of a gear 47 having an axial bore 48 receiving the shaft 27. A small gear 49 is secured to the gear 47 by a sleeve 51. The disk member 41 is secured to the side of a gear 52 having an axial bore 53 receiving the shaft 27. A spacer 54 is positioned between the side of the frame 21 and the side of the disk member 41. The inner portion of the disk member is sandwiched between and secured to the gear 52 and the spacer 54. The bores 48 and 53 have diameters which are slightly larger than the diameter of the shaft 27 so as to rotatably mount the disk members 39 and 41 on the shaft 27. The gear 47 together with the gear 49 and sleeve 51 has an axial length providing the disk member 39 with stability in a plane transverse to the axis of the shaft 27. In a like manner the gear 52 and the spacer 54 has an axial length providing the disk member 41 with similar stability.

The first disk member 39 is drivably connected to the second disk member 41 by a gear train indicated generally at 55 comprising a pair of gears 56 and 57 having an axial bore 58 accommodating an axle 59. Gears 56 and 57 rotate on the axle 59 and have teeth which are in coacting engagement with teeth on the gears 49 and 52 respectively. The axle 59 is secured to and projects from an L-shaped support 60 secured by bolts 61 to a bracket 62 extended around the disk members 39 and 41. The opposite ends of the bracket 62 are secured by bolt and nut assemblies 63 and 64 to the frame 21. The drive speed ratio between the gears 49 and 56 is identical with the ratio between the gears 57 and 52. This ratio is 10 to 1 so that 10 revolutions of the gear 49 results in one revolution of the disk member 41.

The shaft 27 is drivably coupled by a gear train indicated generally at 64 to the first disk member 39. The gear train 64 has a drive ratio of 10 to 1 wherein 10 revolutions of the shaft 27 results in one revolution of the disk member 39. With the circumference of the pulley 26 being 12 inches 10 revolutions of the shaft 27 will be indicated as 10 feet on the number register apparatus 28. Gear train 64 comprises a spline type gear 66 formed on the outer end of the shaft 27 in driving engagement with a large gear 67 secured to a small gear 68 by a sleeve 69. The gears 67 and 68 and the sleeve 69 have an axial bore 71 accommodating a rod 72. One end of the rod 72 has a head 73 engaging the gear 68. The opposite end of the rod 72 is mounted in a tubular guide 74 projected through a hole 76 in the bracket 62. A nut 77 threaded on the outer end of the guide holds the guide in assembled relation with the bracket 62. A spring 78 positioned concentrically about the rod 72 in engagement with the gear 67 and the guide 74 biases the gears 67 and 68 axially along the rod 72 to a drive position. Spring 78 resiliently holds the gear 68 in engagement with the rod head 73.

As shown in FIGURES 4 and 5, the outer end portion of the tubular guide 74 has a pair of diametrically positioned U-shaped axial notches 79 which coact with a transverse pin 81 positioned in a suitable transverse hole in the rod 72. The edges of the U-shaped notches 79 are cam surfaces engaged by opposite portions of the pin 81 to limit the axial movement of the rod 72 toward the pulley 26 caused by the spring 78. The pin 81 is a cam follower which on rotation of the rod 72 as shown in broken lines in FIGURES 4 and 5 axially moves the rod 72 in an outward direction moving the gear 68 from the gear 47 thereby breaking the drive connection between the shaft 27 and the first disk member 39. The notches 79 in conjunction with the rod 72 and pin 81 is a cam release clutch used to connect and disconnect the gear drive between the shaft 27 and the gear 47. By selectively rotating the rod 72 in opposite directions the drive connection between the shaft 27 and the disk members 39 and 41 may be engaged and disengaged. The pin 81 serves as a handle which may be easily gripped with one hand to rotate the shaft 72. With the drive connection disengaged as shown in broken lines in FIGURE 3 the disk members 39 and 41 may be freely rotated on the shaft 27 so that the numerical indicia 44 and 46 may be turned to the zero position.

In use, with the disk members 39 and 41 angularly positioned relative to each other so that the numerical indicia 44 and 46 are in the zero positions the depth of the water may be determined by lowering the anchor 16 until it engages the bottom of the lake. As the anchor line 14 moves over the pulley 26 the pulley rotates one revolution for each foot of cable or line 14. The pulley 26 being secured to the shaft 27 rotates the shaft. Power is transmitted from the shaft 27 to the first disk member 39 by the gear train 64 which includes a relatively large gear 67 in meshing engagement with a spline type gear 66 on the end of the shaft 27. The gear 67 is secured to a small gear 68 which is in meshing engagement with the gear 47 rotatably mounted on the shaft 27. The first disk member 39 is secured to the gear 47. Since the gear train 64 has a drive ratio of 10 to 1 each revolution of the shaft 27 will result in one tenth of a revolution of the disk member 39. The flange 42 is divided into ten circumferentially equally spaced areas and is sequentially numbered to indicate the amount of rope in feet which passes over the pulley 26.

The first disk member 39 is coupled to the second disk member 41 by the gear train 55 which has a 10 to 1 drive ratio so that ten revolutions of the first disk member 39 results in one revolution of the second disk member 49. In this situation the depth of the water would be 10 feet. In other words, the gear trains 55 and 64 produce a 100 to 1 drive speed reduction between the shaft 27 and the second disk member 41.

The depth of the water may be determined in raising the anchor 16 by merely subtracting the figure obtained when the anchor is raised from the initial anchored position. This enables the fisherman to sound or determine the water depth of the lake or stream by raising and lowering the anchor 16. Another advantage of the water depth indicating device 12 is that the length of line put out after the anchor 16 has reached the bottom may be measured to determine the best holding position of the anchor. This is accomplished by allowing the anchor line 14 to run over the pulley 26 until the optimum line angle is reached.

While there have been shown, described, pointed out the fundamental novel features of the invention supplied to a preferred embodiment, it will be understood that various omissions, substitutions, changes in form, and details of the water depth indicating device illustrated may be made by those skilled in the art without departing from the spirit of the invention. It is intended to be limited only as indicated by the scope of the following claims.

What is claimed is:

1. An apparatus for selectively anchoring a boat and determining the depth of water comprising in combination: a boat anchor, a flexible member attached to the anchor, a frame securable to the boat, a transverse shaft rotatably supported on said frame, a pulley secured to a first portion of said shaft, the flexible member being trained over the pulley whereby movement of the flexible member changes the elevation of the anchor and rotates the pulley which in turn rotates the shaft, a first disc member rotatably supported on a second portion of the shaft, said first disc member including a laterally projected flange having an outer face and numerical indicia circumferentially arranged on the outer face to provide a visual indication of the angular position of the first disc relative to an observer, a second disc rotatably supported on said shaft adjacent said first disc member, said second disc member including a laterally projected flange having an outer face and numerical indicia circumferentially arranged on said face to provide a visual indication of the angular position of the second disc member relative to the observer, first gear train means drivably coupling the first disc member with the second disc member for rotation of the second disc member at a slower speed than the first disc member, a bracket secured to the frame extended around the first and second disc members, and power transmitting means connected to said shaft and first disc member for rotating the first disc member in response to rotation of the shaft whereby the length of the flexible member moved around the pulley is indicated by the numerical indicia on the first and second disc members, said power transmitting means including a second gear train means having a control shaft mounted on the bracket carrying gears of the second gear train means, biasing means for holding the gears of the second gear train means in driving engagement and coacting cam means on the bracket and the control shaft which on movement of the control shaft moves the gears of the second gear train means out of driving engagement whereby the first and second disc members are free to rotate on the shaft carrying the disc members enabling the first and second disc members to be moved to zero positions.

2. The combination defined in claim 1 wherein said frame comprises a U-shaped member having spaced legs and end sections adapted to be secured to the boat, said pulley positioned between the legs of the U-section of the frame.

3. The combination defined in claim 1 including a support secured to the bracket, an axle secured to the support, said axle extended generally parallel to the shaft and gears of the first gear train means rotatably mounted on the axle.

4. The combination defined in claim 1 including a tubular guide for movably mounting the control shaft on the bracket.

5. The combination defined in claim 1 wherein said second portion of the shaft extends laterally from the frame and has a gear at the outer end forming part of the second gear train means.

6. The combination defined in claim 1 wherein the coacting cam means on the bracket and the control shaft comprises a tubular guide mounted on the bracket carrying the control shaft, said tubular guide having a notched end, and a transverse pin mounted on the control shaft cooperating with the notched end to hold the gears of the second gear train out of driving engagement.

7. The combination defined in claim 6 wherein gears of the second gear train means are rotatably mounted on the control shaft, said biasing means comprising a spring positioned about the control shaft between said gears and tubular guide.

References Cited

UNITED STATES PATENTS

| | | | |
|---|---|---|---|
| 197,800 | 12/1877 | Schrom | 33—126.5 |
| 210,067 | 11/1878 | Thomson | 33—126.5 X |
| 776,039 | 11/1904 | Veeder | 235—139 X |
| 900,351 | 10/1908 | Brown | 33—126.5 |
| 1,266,631 | 5/1918 | Roy | 33—134 |
| 1,440,034 | 12/1922 | Stoecklin | 235—103 X |
| 1,504,055 | 8/1924 | Kiff | 33—134 |
| 1,618,634 | 2/1927 | Boller | 114—210 X |
| 2,587,766 | 3/1952 | Rouan. | |
| 2,599,200 | 6/1952 | Rogers | 114—210 X |
| 3,068,828 | 12/1962 | Ellis | 114—206 |
| 3,148,542 | 9/1964 | Clift | 33—126.6 X |

FOREIGN PATENTS

| | | |
|---|---|---|
| 175,540 | 2/1922 | Great Britain. |

ROBERT B. HULL, *Primary Examiner.*